Aug. 13, 1968   J. P. REINHOUDT ET AL   3,396,976
DEVICE, PARTICULARLY HOT-GAS RECIPROCATING ENGINE
Filed June 29, 1966   6 Sheets-Sheet 1

INVENTORS
JACOBUS P. REINHOUDT
CORNELIS J.A. TH. MARKS
HENRICUS C.J. VAN BEUKERING
BY

Frank R. Trifari
AGENT

Aug. 13, 1968  J. P. REINHOUDT ET AL  3,396,976
DEVICE, PARTICULARLY HOT-GAS RECIPROCATING ENGINE
Filed June 29, 1966  6 Sheets-Sheet 3

INVENTORS
JACOBUS P. REINHOUDT
CORNELIS J.A.TH. MARKS
HENRICUS C.J. VAN BEUKERING
BY

AGENT

Aug. 13, 1968     J. P. REINHOUDT ET AL     3,396,976

DEVICE, PARTICULARLY HOT-GAS RECIPROCATING ENGINE

Filed June 29, 1966     6 Sheets-Sheet 4

INVENTORS
JACOBUS P. REINHOUDT
CORNELIS J. A. TH. MARKS
HENRICUS C. J. VAN BEUKERING
BY

*Frank R. ~~~~*

AGENT

Aug. 13, 1968   J. P. REINHOUDT ET AL   3,396,976
DEVICE, PARTICULARLY HOT-GAS RECIPROCATING ENGINE
Filed June 29, 1966                                      6 Sheets-Sheet 5

INVENTORS
JACOBUS P. REINHOUDT
CORNELIS J.A.TH. MARKS
HENRICUS C.J. VAN BEUKERING
BY

*Frank R. Trifari*

AGENT

United States Patent Office

3,396,976
Patented Aug. 13, 1968

3,396,976
DEVICE, PARTICULARLY HOT-GAS
RECIPROCATING ENGINE
Jacobus Pieter Reinhoudt, Cornelis Johannes Alphonsus Theodorus Marks, and Henricus Cornelis Johannes Van Beukering, Emmasingel, Eindhoven, Nether'ands, assignors to North American Philips Company, Inc., New York, N.Y., a corporation of Delaware
Filed June 29, 1966, Ser. No. 561,633
Claims priority, application Netherlands, July 13, 1965, 6508994
2 Claims. (Cl. 277—71)

ABSTRACT OF THE DISCLOSURE

A seal between a piston and cylinder and constituting at least one piston ring located in a groove in either the piston ring or cylinder and having some play therein. There is additional means between one side of the piston ring and the adjacent wall of the groove for preventing a full engagement of that piston ring side against the wall.

---

The invention relates to a device, particularly a hot-gas motor, comprising two coaxially arranged elements movable relative to one another, the seal between the said elements being formed by one or more piston rings which are each housed with some clearance in a groove in one of the two elements, the said seal separating two spaces each containing a medium.

In known devices of the type to which the present invention relates, the seal can separate two spaces each containing a gaseous medium or two spaces each containing a liquid. In both cases the known piston ring seals do not give good satisfaction.

If the seal separates two spaces containing a gaseous medium, the seal does not operate satisfactorily when the average pressures on either side of the seal are to be kept constant. This is caused by the fact that piston rings are apt to show some leakage. If the mean pressures are to be constant on either side of the seal, the leakage must be equally large in both directions. This is by no means guaranteed and usually it will not be the case either. The possibility of difference between the quantities leaking in the two directions is augmented in that the pressure differential across the piston rings varies its direction periodically so that the rings will always seal in another position. The rings move from one side of the groove to the other side and the possibility exists that dirt deposits on the sealing surfaces. As a result of this leakage in one direction may differ strongly from the leakage in the other direction.

In the other case, in which the seal separates two spaces filled with a liquid in which varying pressures occur it has been found that known piston rings in principle cannot operate normally. A requirement for a normal operation of a piston ring is that it must be possible that the highest pressure occurs behind the piston ring as a result of which the piston ring is positively forced against the cylinder wall. On account of the fact that the piston ring is surrounded by liquid the radial movements of the ring in its groove caused by possible inaccuracies of the wall of the cylinder are impeded and the possibility exists that the highest pressure which occurs in one of the two separated spaces does not occur behind the ring. In that case the piston ring is not sufficiently strongly forced against the wall of the cylinder so that the piston cannot sufficiently engage the cylinder wall and leakage will occur.

It is the object of the invention to provide a solution to the above described sealing difficulties.

The device according to the invention is characterized in that means are provided between one side of each of the piston rings and the wall of the groove in question cooperating with that said side, said means preventing a full engagement of that side against the wall in question so that each of the piston rings can restrict leakage of medium in one axial direction only.

According to a further embodiment of the device according to the invention the means which prevent a full engagement of one side of each of the piston rings against the cooperating wall of the groove are constituted by one or more weakly flexible members, for example, springs.

In a further favorable embodiment of the device according to the invention said means are constituted by grooves extending at least substantially radially in the side in question of each of the piston rings and/or the wall of the relative groove cooperating with the said side. It will be clear that other means may also be used to prevent a full engagement of the piston ring against the wall of the groove.

In the device according to the invention a pressure differential which is substantially always directed to the same side will prevail across the piston ring as a result of the construction of the said ring. Consequently, the piston ring is substantially always forced against the same side so that the possibility of dirtiness of said sealing surface is extremely small.

As a result of the fact that the piston ring cannot seal against the other wall of the groove, great leakage will occur when the pressure differential across the ring varies its direction. This has for its result that the mean pressures in the spaces on either side of the seal are exclusively determined by the pressure variation in the said spaces. The mean pressures will now be constant and reproducible. This will be described in greater detail hereinafter with reference to the description of the figures.

In the device according to the invention the highest pressure in the device always prevails in the space in the groove behind the piston ring. As a result of this the piston ring is readily forced against the cylinder wall. In circumstances it may be desirable to divide the total pressure differential across the seal between several piston rings.

For this purpose, in a further favourable embodiment of the device according to the invention, in which the seal separates two closed spaces which are filled with a gaseous medium, the seal is constituted by several piston rings, the sides of the piston rings which cooperate with the said means which prevent a full engagement of the said sides against the wall of the groove cooperating therewith all being located in the same direction, the spaces between the piston rings each having a small volume.

In this embodiment the pressure differential across each of the piston rings will be smaller according as the number of piston rings increases. As a result of this the surface pressure also between the rings and the cylinder wall will be smaller. In a further favourable embodiment of the device according to the invention the seal is constituted by at least one pair of piston rings in which the sides of the piston rings which cooperate with the said means which prevent a full engagement of those sides against the walls of the grooves cooperating therewith are remote from one another or are facing one another, the space between the two piston rings having such a large volume in relation to the leakage occurring across each of the piston rings in the direction in which each of the piston rings can restrict the leakage of medium that the minimum and maximum pressures respectively occurring in the two spaces on either side of the seal are substantially equal to one another.

In this embodiment the pressure in the space between the piston rings will correspond to the minimum or maximum pressure—dependent upon the direction in which the piston rings restrict leakage of medium—which occurs in the two spaces or either side of the seal.

In a further favourable embodiment in which the seal separates two spaces filled with liquid in which varying pressures occur, the seal according to the invention is constituted by at least one pair of piston rings, the sides of the piston rings which cooperate with the said means which prevent a full engagement of those sides against the walls of the grooves cooperating therewith, facing one another or being remote from one another.

In this embodiment a pressure differential which is substantially always directed in the same direction will prevail across each of the piston rings. As a result of this each ring will substantially always again engage the same wall of the groove so that no dirt can deposit between the ring and the wall of the groove. Furthermore, in this embodiment the space behind the ring always communicates through a rather wide channel with a space in which a high pressure prevails so that the ring is always readily forced against the wall of the cylinder and only leakage will occur between the wall of the cylinder and the ring. Of each pair of cooperating piston rings one ring will leak in one direction and the other ring will leak in the opposite direction. This means that the piston rings together constitute a seal in both directions.

In circumstances it may be desirable, also when the seal is arranged between two spaces for liquid, to divide the pressure differential between several piston rings. In order to achieve this the seal according to a further embodiment is constituted by a first number of piston rings succeeding one another when viewed in the axial direction, all the sides of those piston rings which cooperate with the said means which prevent a full engagement of those sides against the groove wall cooperating therewith being located in the same direction and by a second number of piston rings likewise succeeding one another in the axial direction, all the sides which cooperate with the said means which prevent a full engagement of those sides against the walls of the grooves cooperating therewith being located in the opposite direction.

As appears from the above the invention provides a construction of a seal which, when applied as a seal between two gas spaces, ensures that the mean pressures on either side of the seal are constant and reproducible, while, when applied two liquid spaces, a ready seal is obtained in contrast with known piston rings.

In order that the invention may readily be carried into effect a number of devices provided with seals will now be described in greater detail, by way of example, with reference to the accompanying drawing, in which the devices are shown diagrammatically and not to scale.

Figure 1:
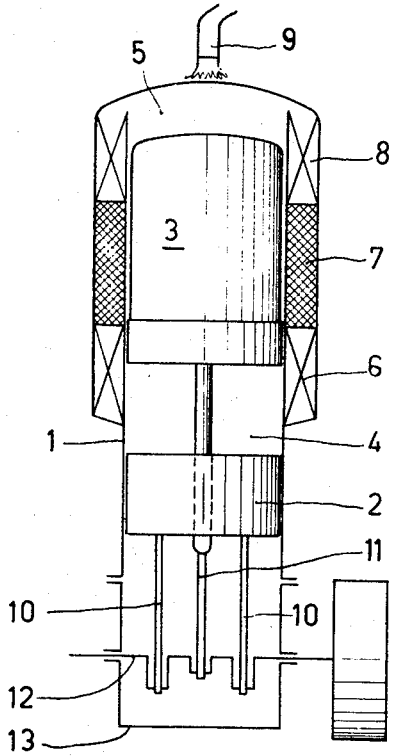
FIG. 1 shows a hot-gas motor.

Referring now to FIG. 1, reference numeral 1 denotes a cylinder in which a piston 2 and a displacer 3 reciprocate. The working surface of the piston varies the volume of a compression space 4 and the working surface of the displacer varies the volume of an expansion space 5. These two spaces communicate with one another through a cooler 6, a regenerator 7 and a heater 8. A burner 9 supplies heat to the walls of the expansion space 5. The piston 2 and the displacer 3 are secured to a crankshaft 12 by means of piston driving rods 10 and a displacer rod 11. The crankshaft 12 is journalled in a closed sump 13. The piston 2 in this construction separates two closed spaces, namely the sump 13 and the working space constituted by the compression space 4, the expansion space 5 and the communication channels between the said spaces. It is desirable that the mean pressures in the two separated spaces are constant and reproducible. As a result of their dissymmetrical leakage known piston ring seals do not give satisfaction in this construction. Piston ring seals which do satisfy the above requirement are shown in the figures to be discussed hereinafter. For clearness' sake the said figures only show the piston with the part of the cylinder cooperating therewith.

It is to be noted that, although FIG. 1 shows a hot-gas motor as an example of a device in which a piston separates two closed spaces, there do exist other devices, for example, cold-gas refrigerators, in which a piston separates two closed spaces.

Figure 2:
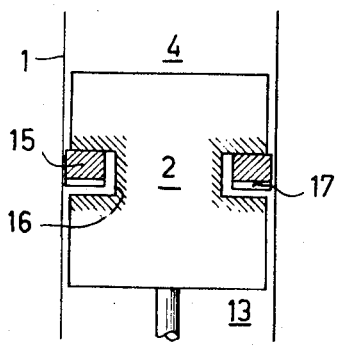
FIGS. 2, 2a, 3 and 3a show two pistons each separating two closed spaces. The seal between the piston and the wall of the cylinder in this piston is constituted by one piston ring.
Figure 2A:
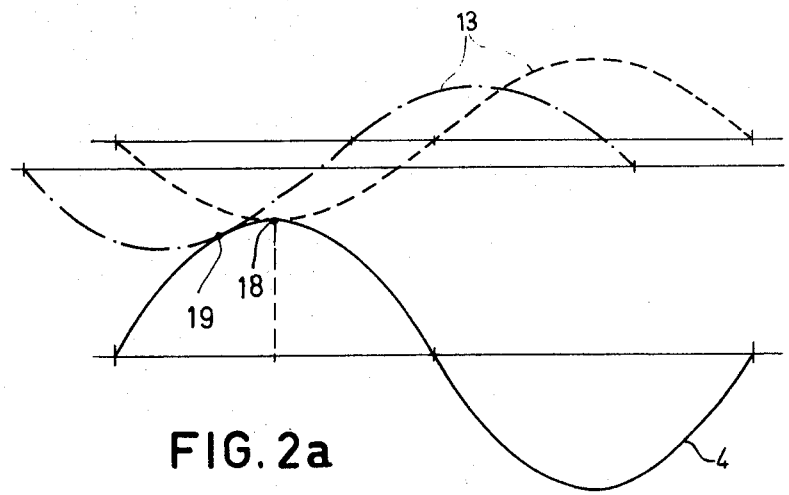

FIG. 2 shows a piston 2 in which the seal is constituted by one piston ring 15. This piston ring 15 is arranged in a groove 16 in the piston, the lower side of the ring being provided with a number of radial grooves 17 which prevent a full engagement of the piston ring against the wall of the groove. Normally the piston ring 15 will restrict leakage of medium from the space 13 to the space 4. This means that in circumstances a small quantity of medium per cycle can leak to the space 4. In the other direction the piston ring, however, permits leakage as a result of the presence of the grooves 17. The result of this is that when a given quantity of medium is in the two spaces 4 and 13 a given pressure variation will be adjusted in the space 4 such that the pressure in that space continuously is smaller than the pressure in the space 13. At one point of the cycle the pressures in the two spaces will exactly be equal to one another; if at this point the pressure in the space 4 would become higher than that in the space 13, the ring 15 will be forced downwards to some extent and permits leakage so that then a pressure compensation can take place. In this manner it is reached that the means pressure in the space 4, as well as that in the space 13, is determined by the pressure variation occurring in these spaces. The mean pressures will remain constant also after a prolonged operation. The pressure variation in the spaces 4 and 13 is shown in FIG. 2a. The pressure variation in the space 4 is indicated by a solid line. The variation in the space 13 for the case that said variation has a phase difference of 180° with respect to the variation in space 4 is indicated by a broken line. For the case that the pressure variations have another phase difference the variation of the pressure in the space 4 is indicated by a dot-and-dash line. For the case of 180° phase difference the pressures in the spaces 4 and 13 at point 18 always become equal to one another. If from the space 13 a quantity of medium has leaked to the space 4, the pressure at that point in the space 4 will become higher than that in the space 13. As a result of this the piston ring 15 will be forced away from the wall of the groove as a result of which the two spaces are made to communicate with one another and pressure compensation takes place since the piston ring cannot fully engage the other wall of the groove, For this case of a phase difference other than 180° the pressure compensation will take place, for example, at point 19.

In this manner always the same constant and previously adjustable mean pressure prevails in the spaces.

Figure 3:
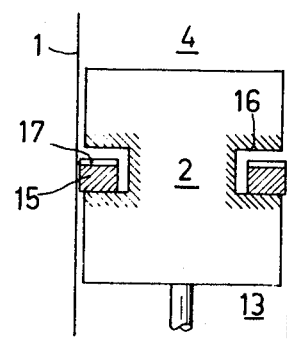
Figure 3A:
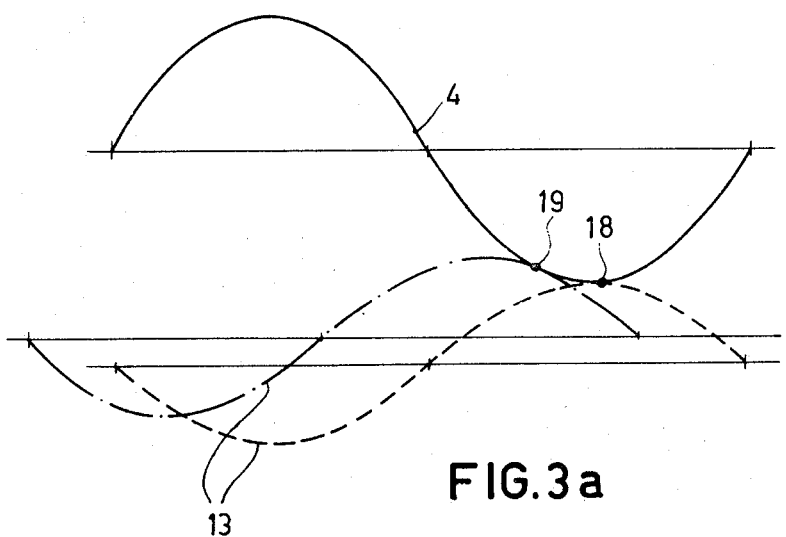

FIG. 3 shows an another embodiment of the seal. The side of the piston ring 15 which is provided with grooves 17 is directed to the space 4. The result of this is that a pressure will be adjusted in the space 4 which is continuously larger than the pressure in the space 13. The respective pressure variations are shown in FIG. 3a. The operation of said seal further is entirely equal to that of FIG. 2.

Figure 4:
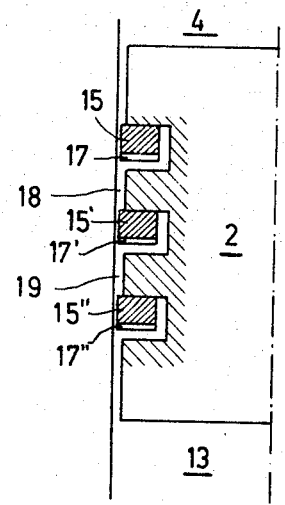
FIG. 4 shows a piston in which the seal is constituted by three piston rings which all leak in the same direction.

As is shown in FIG. 4 the seal may also be constituted by several piston rings 15, 15', 15" which are all provided with grooves 17, 17', 17" on one side. The sides of the piston rings which comprise the grooves are all directed to the same side, the spaces 18 and 19 between the piston rings having a small volume to divide the pressure differential between the piston rings.

In the seal described in FIGS. 2 and 3 a pressure differential prevails across the seal which is always directed to the same side.

Figure 5:
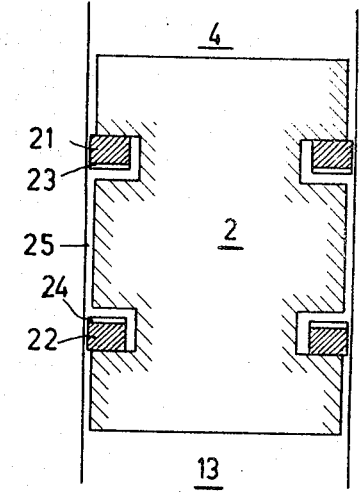
FIGS. 5, 5a, 6 and 6a show two pistons each separating two closed spaces, the seal between the piston and the cylinder wall being constituted by two piston rings.
Figure 6:
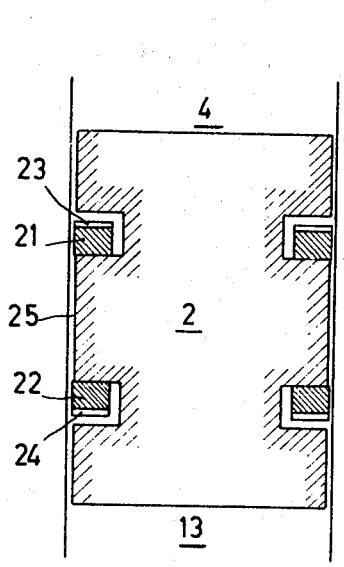

In the embodiment of the device shown in FIGS. 5 and 6 a varying pressure differential may prevail across the seal. In the device shown in FIG. 5 the seal is constituted by two piston rings 21 and 22. Each of these piston rings is provided on one side with grooves 23 and 24 which prevent a full engagement of these rings against the wall of the groove in question.

Figure 5A:
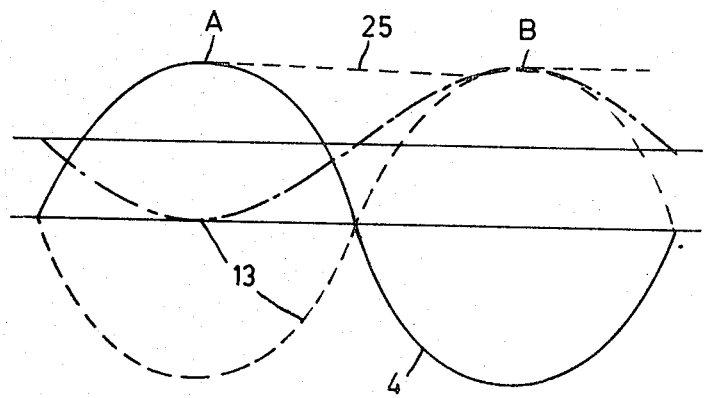

The sides of the piston rings which cooperate with the said grooves 23 and 21 are facing one another. This means that in the space 25 between the piston rings 21 and 22 the maximum pressure prevails which will occur in the spaces 4 and 13 on either side of the seal. The pressure variation which will be adjusted in this seal in the spaces 4, 13 and 25 is shown in FIG. 5a.

The solid line denotes the pressure variation in the space 4. At point A the pressure will be at a maximum and equal to the pressure in the space 25. If the pressure in the space 4 at this point is higher than that in the space 25 the piston ring 21 is forced away from the wall of the groove and the pressures in the two spaces will be compensated. Then the pressure in the space 4 again is decreased. The pressure in the space 25, however, remains substantially constant. Only a little medium will leak to the space 4 and 13. The volume of the space 25 is so large with respect to the said leakage, that said leakage has very little influence on the pressure in the space 25. At point B again a compensation of pressures takes place, this time between the spaces 25 and 13. The pressure variation in the space 13 for a case in which the mean pressure is equal to that in the space 4 is denoted by a broken line. For another case in which in the space 13 another mean pressure prevails said pressure variation is denoted by a dot-and-dash line. In both cases a phase difference of 180° is assumed although this is not necessary. The seal operates equally readily at another phase difference between the pressure variations. The pressure in the space 25 is substantially constant so that also the maximum pressures occurring in the spaces 4 and 13 will be substantially constant and equal to one another. In this manner a seal is obtained in which the mean pressures in the spaces 4 and 13 are determined by the pressure variation occurring in those spaces. Across each of the two piston rings again a pressure differential prevails which is substantially always directed to the same side so that the rings always engage the same wall of the groove. As a result of this the possibility of dirtiness of the sealing surfaces is small.

Figure 6A:
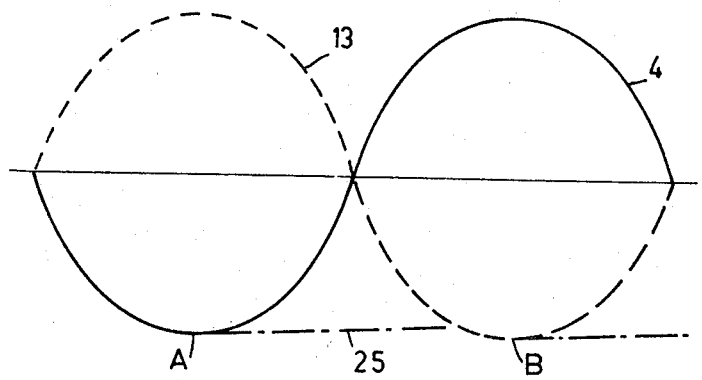

FIG. 6 shows a further embodiment of a seal constituted by two piston rings. The piston rings are again denoted by references numerals 21 and 22. The sides of the said rings which are provided with grooves 23 and 24 are now remote from one another. In the space 25 consequently a pressure will prevail which is at least substantially equal to the minimum pressure which occurs in the spaces 4 and 13. The pressure variation is shown in FIG. 6a and after the above explanation the operation of the seal will be clear.

Figure 7:
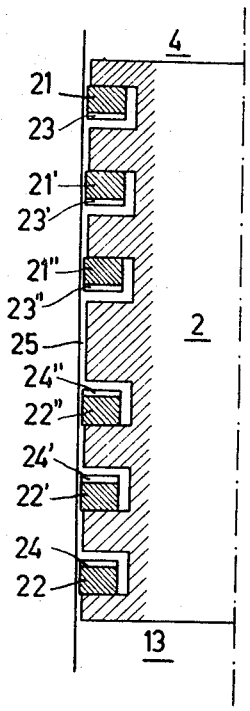
FIG. 7 shows a piston in which the seal is constituted by two sets of cooperating piston rings.

FIG. 7 shows that the seal shown in FIG. 5 and FIG. 6 respectively may also be constituted by two sets of piston rings 21, 21', 21" and 22, 22', 22", the sides of each set which are provided with grooves 23, 23' and 23" and 24, 24', 24" respectively being directed to the same side. In this manner also a readily operating seal is obtained in which the pressure differential is now divided between three piston rings.

Figure 8:
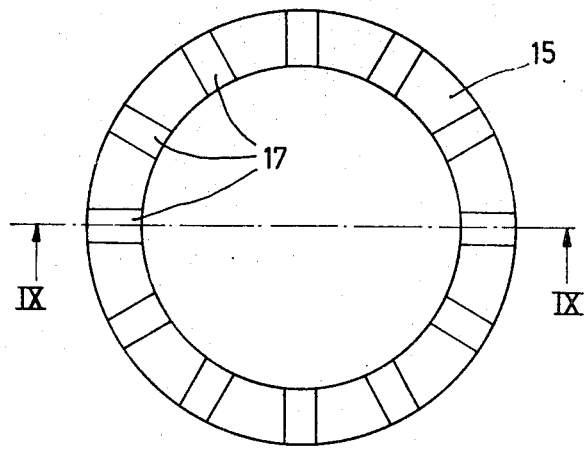
FIG. 8 shows a piston ring seal in which the means which prevent the engagement on one side of the piston ring against the wall of the groove in question are constituted by a spring.
Figure 9:
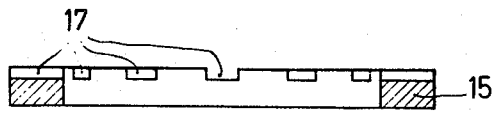
FIGS. 9 and 10 show a plan view and a side elevation respectively of part of a piston ring provided with grooves.

In the figures described the means which prevent a full engagement of one side of each piston ring against the wall of the groove operating therewith are constituted by substantially radial grooves as shown for clearness' sake in FIGS. 8 and 9 in which part of a piston ring is shown in plan view and in side elevation. The grooves are denoted by reference numerals 17.

Instead of grooves other means may also be used. For example, it is possible to groove the wall of the cylinder instead of the piston ring.

Figure 10:
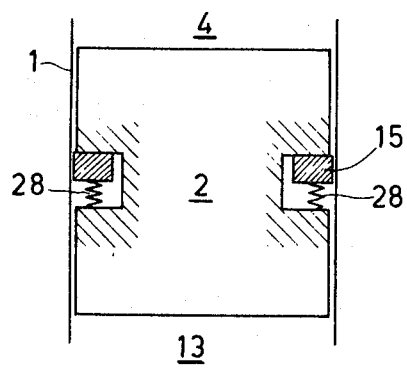

In addition it is possible, as shown in FIG. 10, to arrange one or more weak springs 28 between one side of the piston ring and the wall of the groove which springs also prevent the engagement of the piston ring against that wall of the groove.

Figure 11:
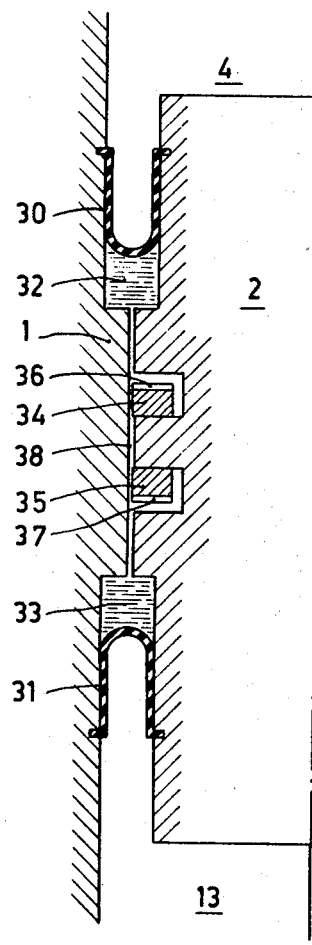
FIGS. 11 and 12 show two piston ring seals each comprising two piston rings, the seal separating two liquid spaces.
Figure 12:
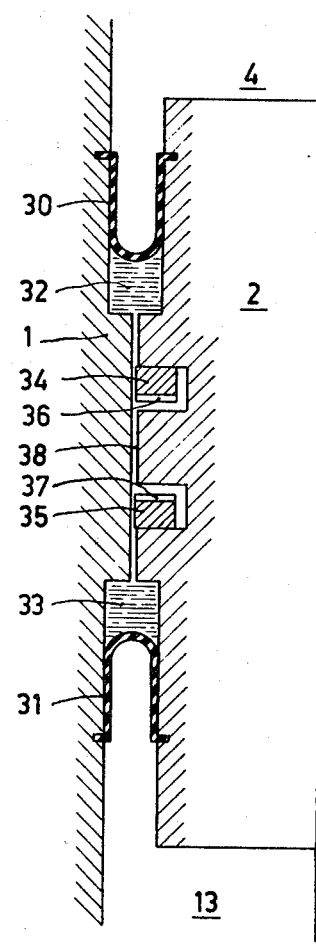

FIGS. 11 and 12 show two embodiments of devices in which the seal is arranged between two liquid spaces. This device again comprises a cylinder wall 1 with a reciprocating piston 2. The seal between the piston and the cylinder wall is constituted by rolling diaphragms 30 and 31 which are supported by liquid in spaces 32 and 33. The seal between the liquid spaces 32 and 33 is constituted by two piston rings 34 and 35. The piston rings on their sides remote from one another are provided with grooves 36 and 37 which prevent a full engagement of the piston rings against the wall of the groove in question. In this manner it is reached that first of all the spaces in the groove behind the piston rings always communicate through a comparatively wide channel with the spaces 32 and 33 respectively. As a result of this each piston ring has sufficient freedom of motion in the groove so as to be able to engage the cylinder wall readily also in the case of any inaccuracies. In addition, since the rings leak in one direction the pressure in the space 38 between the rings will at any moment be equal to the minimum pressure which prevails at that instant in one of the two spaces 32 and 33. Behind the piston rings always the higher pressure will prevail which occurs on one of the two sides of the piston ring so that each ring is readily forced against the wall of the cylinder so that no inadmissable leakage will occur. Since the piston ring 34 counteracts leakage in the upward direction and the piston ring 35 counteracts leakage in the downward direction a seal in both directions is obtained which, in contrast with known piston ring seals, has a satisfactory operation. FIG. 12 shows the same device as FIG. 11 with the differences that in this device the sides of the piston rings 34 and 35 which are provided with grooves 36 and 37 are facing one another. The result of this is that in this embodiment the pressure in the space 38 will at any instant be equal to the maximum pressure which occurs at that instant in the spaces 32 and 33. Further the operation of said seal is the same as that shown in FIG. 11.

What is claimed is:

1. A device comprising two co-axially arranged elements which are movable relative to each other and together define two spaces for containing a fluid medium, at least two grooves in one of said elements, a seal between said elements being constituted by at least one pair of spaced piston rings each located in one of said grooves, said seal separating said two spaces, separation means between one side of each piston ring and the adjacent wall of the groove co-acting therewith for preventing a full engagement of said side against said wall so that each of said piston rings substantially prevents leakage of medium in one axial direction and allows leakage in the opposite axial direction; the sides of said piston rings which coact with said separation means being positioned to face one another.

2. A device as claimed in claim 1 wherein said seal separates said two spaces containing a gaseous medium and includes an additional space between said two piston rings having such a large volume in relation to said leakage occurring across each of said piston rings in the direction in which each of said piston rings substantially prevents leakage of said medium that the minimum and maximum pressures occurring in said space between said piston rings are substantially equal.

References Cited

UNITED STATES PATENTS

| | | | |
|---|---|---|---|
| 1,166,644 | 1/1916 | Williams | 277—70 X |
| 1,472,073 | 10/1923 | La Course | 277—75 |
| 1,646,143 | 10/1927 | Forster | 277—173 |
| 1,936,430 | 11/1933 | Gordon | 277—70 |
| 1,984,409 | 12/1934 | Gordon | 277—173 X |
| 1,988,727 | 1/1935 | Gordon | 277—70 |
| 2,652,298 | 9/1953 | Esty | 277—173 |

MARTIN P. SCHWADRON, *Primary Examiner.*

G. N. BAUM, *Assistant Examiner.*